US010249204B2

(12) United States Patent
Townsend

(10) Patent No.: US 10,249,204 B2
(45) Date of Patent: Apr. 2, 2019

(54) CONNECTED VEHICLE TRAFFIC SAFETY SYSTEM AND A METHOD OF PREDICTING AND AVOIDING CRASHES AT RAILROAD GRADE CROSSINGS

(71) Applicant: Siemens Industry, Inc., Alpharetta, GA (US)

(72) Inventor: Walter Rankin Townsend, Lawrenceville, GA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 301 days.

(21) Appl. No.: 15/208,126

(22) Filed: Jul. 12, 2016

(65) Prior Publication Data
US 2018/0018888 A1  Jan. 18, 2018

(51) Int. Cl.
*G08G 7/02* (2006.01)
*B60Q 9/00* (2006.01)
(Continued)

(52) U.S. Cl.
CPC ............... *G08G 7/02* (2013.01); *B60Q 9/008* (2013.01); *B60W 10/18* (2013.01); *B60W 50/14* (2013.01); *B61L 25/025* (2013.01); *B61L 29/30* (2013.01); *B61L 29/32* (2013.01); *G08G 1/161* (2013.01); *B60W 2050/143* (2013.01); *B60W 2550/00* (2013.01); *B60W 2710/18* (2013.01); *B61L 15/0027* (2013.01); *B61L 2205/04* (2013.01)

(58) Field of Classification Search
None
See application file for complete search history.

(56) References Cited

U.S. PATENT DOCUMENTS 5,864,304 A    1/1999  Gerszberg et al.
7,075,427 B1 *  7/2006  Pace ...................... B61L 23/06
                                              246/125

(Continued)

FOREIGN PATENT DOCUMENTS

CN     2297760 Y   * 11/1998
CN   202057331 U   * 11/2011
(Continued)

OTHER PUBLICATIONS

PCT International Search Report and Written Opinion of International Searching Authority dated Oct. 10, 2017 corresponding to PCT International Application No. PCT/US2017/036992 filed Jun. 12, 2017.

*Primary Examiner* — Shelley Chen

(57) ABSTRACT

A connected vehicle train-vehicle collision detection system comprises a roadside unit (RSU) located at a railroad grade crossing near a roadway lane for avoiding TRAIN crashes with Onboard Unit (OBU)-equipped vehicles by issuing advance warnings for a potential vehicle-train crash. The roadside unit (RSU) is configured to act as a proxy Onboard Unit (OBU) for a non-OBU-equipped TRAIN and transmit a train location to a first Onboard Unit (OBU)-equipped vehicle having an Onboard Unit (OBU). The Onboard Unit (OBU) of the first OBU-equipped vehicle is configured to calculate a train-vehicle crash based on the train location of the TRAIN relative to the railroad grade crossing and a vehicle location of the first OBU-equipped vehicle relative to the railroad grade crossing.

13 Claims, 5 Drawing Sheets

(51) Int. Cl.
*B60W 10/18* (2012.01)
*B60W 50/14* (2012.01)
*G08G 1/16* (2006.01)
*B61L 25/02* (2006.01)
*B61L 29/30* (2006.01)
*B61L 29/32* (2006.01)
*B61L 15/00* (2006.01)

(56) References Cited

U.S. PATENT DOCUMENTS

| | | | |
|---|---|---|---|
| 8,386,156 | B2 | 2/2013 | Miller |
| 8,519,868 | B2 | 8/2013 | Nadeem et al. |
| 8,870,126 | B2 | 10/2014 | Bock et al. |
| 8,976,041 | B2 | 3/2015 | Buckel |
| 9,013,325 | B2 | 4/2015 | Miller et al. |
| 2002/0185571 | A1 | 12/2002 | Bryant et al. |
| 2005/0205719 | A1* | 9/2005 | Hendrickson ....... B61L 15/0027 246/122 R |
| 2008/0169385 | A1* | 7/2008 | Ashraf .................... B61L 29/22 246/130 |
| 2012/0038836 | A1* | 2/2012 | Taherloo ................. G09F 19/18 348/789 |
| 2013/0289805 | A1 | 10/2013 | Makkinejad |
| 2014/0263857 | A1* | 9/2014 | Huntimer ............. B61L 25/025 246/122 R |

FOREIGN PATENT DOCUMENTS

| | | | |
|---|---|---|---|
| CN | 101607565 B | * | 6/2013 |
| DE | 3238329 A1 | | 4/1984 |
| EP | 2671623 A2 | | 7/2013 |
| JP | 6391463 B2 | * | 9/2018 |
| WO | 2011106834 A1 | | 9/2011 |
| WO | 2014028972 A1 | | 2/2014 |
| WO | WO-2014028972 A1 * | 2/2014 | ............ B61L 25/025 |
| WO | 2014059487 A1 | | 4/2014 |
| WO | 2014151095 A2 | | 9/2014 |
| WO | WO-2014151095 A2 * | 9/2014 | ............ B61L 25/025 |

* cited by examiner

CONNECTED VEHICLE TRAFFIC SAFETY SYSTEM AND A METHOD OF PREDICTING AND AVOIDING CRASHES AT RAILROAD GRADE CROSSINGS

BACKGROUND

1. Field

Aspects of the present invention generally relate to a system and a method of predicting and avoiding crashes at railroad grade crossings and more specifically relates to a connected vehicle traffic safety system for vehicles equipped with an Onboard Unit (OBU) that prevents collisions between a train and a vehicle based on a predicted collision trajectory between the vehicle and the train, warns a driver of a predicted collision for crash avoidance and activates active safety countermeasures.

2. Description of the Related Art

Connected vehicles are becoming a reality, which takes driver assistance towards its logical goal: a fully automated network of cars aware of each other and their environment. A connected vehicle system makes mobility safer by connecting cars to everything.

Vehicular communications systems are networks in which vehicles, personal mobile devices (Onboard Units or OBUs) and roadside units (RSUs) are the communicating nodes, providing each other with information, such as safety warnings and traffic information. They can be effective in avoiding crashes and traffic congestion. Both types of nodes are generally dedicated short-range communications (DSRC) devices. DSRC works in 5.9 GHz band with bandwidth of 75 MHz and approximate range of 1000 m.

Vehicular communications systems are usually developed as a part of intelligent transportation systems (ITS). For example, a Vehicle to Vehicle (V2V) communications system is an automobile technology designed to allow automobiles to "talk" to each other. These systems generally use a region of the 5.9 GHz band set aside by the United States Congress in 1999, the unlicensed frequency also used by Wi-Fi. The V2V communications system is currently in active development by many car makers.

Approximately 2,000 vehicle-train crashes occur at highway or railroad grade crossings per year, resulting in around 250 fatalities and 1,000 injuries per year. An Exit Gate Management System (EGMS) is used for solving this problem. A typical Exit Gate Management System (EGMS) is described in U.S. Patent Application Publication No. US20020185571. Prior to the EGMS, several methods were used individually or in combination to prevent train/vehicle crashes at railroad grade crossings. These systems include a) a flashing signal: the approaching train is detected, triggering a flashing Red signal toward vehicles, b) an acoustic signal: the approaching train is detected, triggering an audible bell for drivers, c) entrance gates: the approaching train is detected, dropping gates at each crossing entrance lane, and d) exit gates: the approaching train is detected, dropping gates at each crossing exit lane.

The above set forth EGMS combines above items a-d into an integrated system of visual signals, audible warnings and entrance gates to prevent vehicles from entering the crossing as well as exit gates to prevent vehicles from driving around the entrance gates. The EGMS includes a Boolean logic and vehicle detectors to prevent vehicles from being trapped on the crossing between the entrance and exit gates. However, despite these measures in place, hundreds of highway fatalities occur per year due to vehicle-train crashes.

Therefore, there is a need for improvements in predicting and avoiding vehicle-train crashes at railroad grade crossings before they occur in a connected vehicle system.

SUMMARY

Briefly described, aspects of the present invention relate to a mechanism for predicting crashes before they occur to warn drivers and to activate automatic braking, which will avoid vehicle-train crashes. A connected vehicle traffic safety system is provided for vehicles equipped with an Onboard Unit (OBU) to prevent collisions between trains and vehicles based on predicted collision trajectories between the vehicles and the trains, warn drivers of predicted collisions for crash avoidance and activate vehicle active safety systems. The connected vehicle traffic safety system includes a roadside unit (RSU). The connected vehicle traffic safety system is configured to: precisely predict an arrival time of a train at a railroad grade crossing, precisely predict arrival times of multiple vehicles at the railroad grade crossing, predict collision trajectories between vehicles and trains, warn drivers of predicted collisions well in advance of a train arrival, and activate automatic braking and other active safety countermeasures for crash avoidance. One of ordinary skill in the art appreciates that such a connected vehicle system can be configured to be installed in different environments where drivers are warned of predicted vehicle-train crashes, for example, based on arrival times of a TRAIN and an Onboard Unit (OBU)-equipped vehicle having an Onboard Unit (OBU) and warnings are issued to all near-by vehicles equipped with an OBU to prevent collisions.

In accordance with one illustrative embodiment of the present invention, a connected vehicle train-vehicle collision detection system is provided. The connected vehicle train-vehicle collision detection system comprises a roadside unit (RSU) configured to be located at a railroad grade crossing near a roadway lane. The roadside unit (RSU) is configured to calculate a first arrival time of a TRAIN at the railroad grade crossing based on a location data and a speed data of the TRAIN near the railroad grade crossing. The roadside unit (RSU) is configured to transmit a first connected vehicle message to a first Onboard Unit (OBU)-equipped vehicle having an Onboard Unit (OBU) at the railroad grade crossing. The first connected vehicle message includes the location data and the speed data of the TRAIN as it approaches the railroad grade crossing. The Onboard Unit (OBU) of the first OBU-equipped vehicle is configured to calculate a train-vehicle crash indication based on the first arrival time of the TRAIN at the railroad grade crossing and a second arrival time of the first OBU-equipped vehicle at the railroad grade crossing. The Onboard Unit (OBU) of the first OBU-equipped vehicle is configured to generate a first warning for the train-vehicle crash indication if the first OBU-equipped vehicle is predicted to arrive at the same time as the TRAIN since the first arrival time of the TRAIN and the second arrival time of the first OBU-equipped vehicle are substantially same.

In accordance with another illustrative embodiment of the present invention, a connected vehicle train-vehicle collision detection system is provided. The connected vehicle train-vehicle collision detection system comprises a roadside unit (RSU) located at a railroad grade crossing near a roadway lane. The roadside unit (RSU) is configured to act as a proxy Onboard Unit (OBU) for a non-OBU-equipped TRAIN and transmit a train location to a first Onboard Unit (OBU)-equipped vehicle having an Onboard Unit (OBU). The Onboard Unit (OBU) of the first OBU-equipped vehicle is configured to calculate a train-vehicle crash indication based on the train location of the TRAIN relative to the railroad grade crossing and a vehicle location of the first OBU-equipped vehicle relative to the railroad grade crossing.

In accordance with yet another illustrative embodiment of the present invention, a method of predicting and avoiding a vehicle-train crash at a railroad grade crossing is provided. The method includes providing location data and speed data of a non-OBU-equipped TRAIN from a roadside unit (RSU) located at the railroad grade crossing near a roadway lane and acting as a proxy Onboard Unit (OBU) for the TRAIN, predicting a train-vehicle crash based on a first arrival time of the TRAIN at the railroad grade crossing and a second arrival time of a first Onboard Unit (OBU)-equipped vehicle having an Onboard Unit (OBU) at the railroad grade crossing and generating a first warning for the train-vehicle crash if the first OBU-equipped vehicle is predicted to arrive at the same time as the TRAIN since the first arrival time of the TRAIN and the second arrival time of the first OBU-equipped vehicle are substantially same.

DETAILED DESCRIPTION

To facilitate an understanding of embodiments, principles, and features of the present invention, they are explained hereinafter with reference to implementation in illustrative embodiments. In particular, they are described in the context of a connected vehicle system for train-vehicle collision detection and generating warnings. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

In a connected vehicle system, some vehicles are equipped with an On-Board Unit (OBU). The connected vehicle system serves at least one Onboard Unit (OBU)-equipped vehicle and uses at least one Roadside Unit (RSU) and optionally a traffic signal controller. For interoperability with all vehicles, the connected vehicle system may employ Connected Vehicle wireless communications standards. U.S. Department of Transportation studies indicate that 80% of the non-impaired highway fatalities could be avoided if each vehicle were aware of the traffic signal countdown to red and aware of nearby moving objects on collision courses. The National Highway Transportation Safety Agency has begun rulemaking for legislation requiring new vehicles to be equipped with an On-Board Unit (OBU).

Consistent with one embodiment, the OBU privately and securely: a) transmits vehicle location, heading and speed to nearby vehicles ten times per second, b) receives location heading and speed from nearby vehicles, cyclists and pedestrians, c) receives lane locations from a Roadside Unit (RSU), d) receives traffic signal countdown from the RSU, e) receives associated signal phase to lane information from the RSU to know which signal to obey, f) requests signal actuation from an authorized vehicle, such as a police car, g) receives signal status in order to verify signal actuation, and h) calculates train collision warnings long before the driver would be able to see RR1 and RR2 signage.

Figure 1:
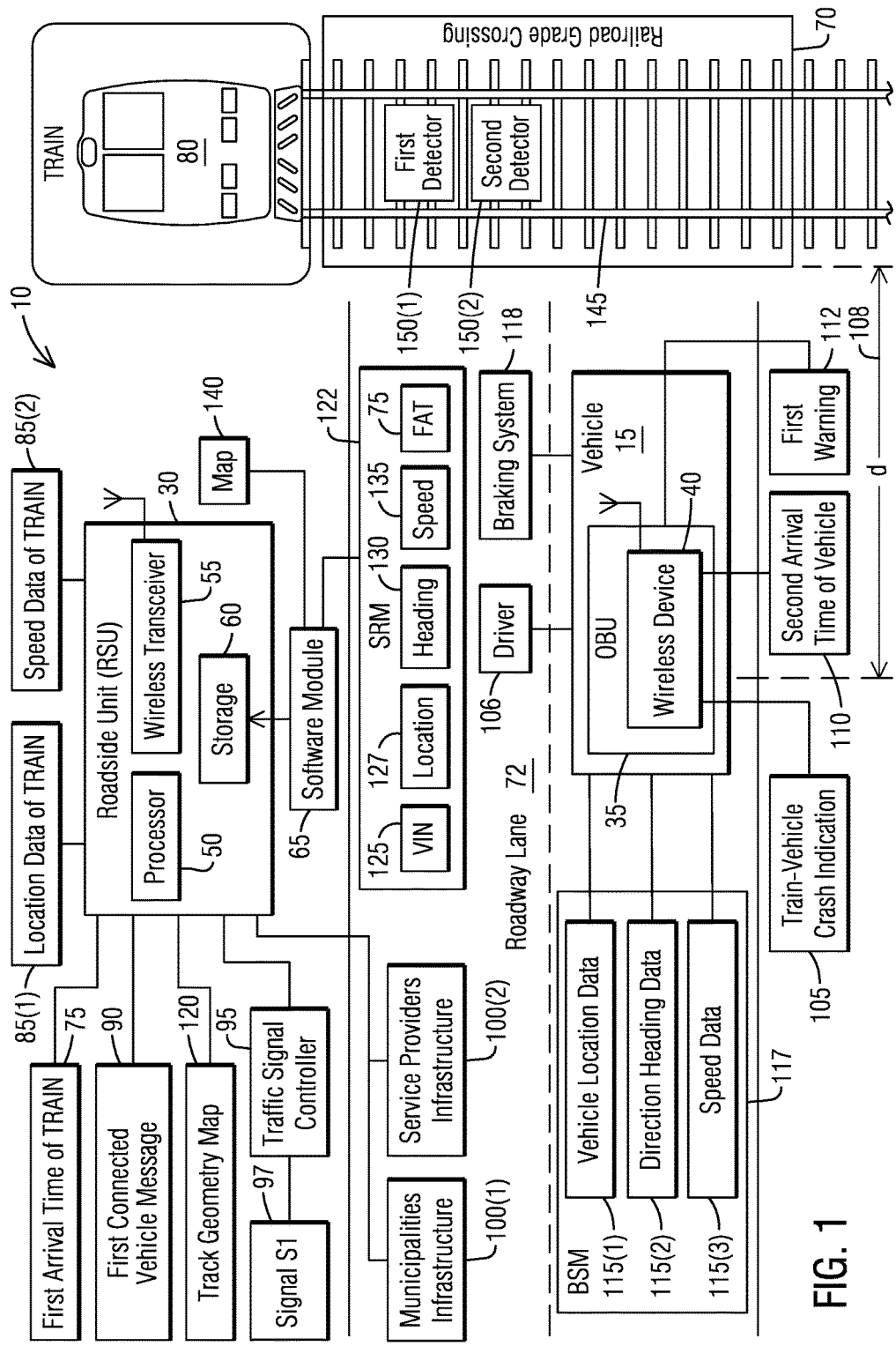
FIG. 1 illustrates a schematic of a connected vehicle system that predicts and avoids train-vehicle crashes at railroad grade crossings in accordance with an exemplary embodiment of the present invention.

FIG. 1 illustrates a schematic of a connected vehicle train-vehicle collision detection system 10 for vehicle-train crash avoidance and generating warnings in accordance with an exemplary embodiment of the present invention. The connected vehicle train-vehicle collision detection system 10 provides vehicular communications as a part of an intelligent transportation system (ITS). The connected vehicle train-vehicle collision detection system 10 may enable a network for vehicular communications in which an Onboard Unit (OBU)-equipped vehicle 15 and a Roadside Unit (RSU) 30 act as communicating nodes, providing each other with information, such as safety warnings and traffic information. The RSU 30 has one or more wireless transceivers such as Ethernet, DSRC, Cellular and Wi-Fi that can be used interchangeably. The Roadside Unit (RSU) 30 may communicate via 3 radio channels such as a control channel for automatic braking, a service channel for vital signs and a Wi-Fi channel for controller service and evacuation maps etc.

Consistent with one embodiment, these types of communicating nodes may use dedicated short-range communications (DSRC) devices. DSRC work in the 5.9 GHz frequency band with bandwidth of 75 MHz and has an approximate range of 1000 m. Alternatively however, 5G cellular communications technology or protocols, devices may replace the DSRC devices in the connected vehicle train-vehicle collision detection system 10 for creating standard messages.

As used herein, "a vehicle (V) equipped with an Onboard Unit (OBU)" refers to a vehicle that connects to sensors, decision-making systems and control systems for enabling a safety system for connected vehicles. As used herein, a Roadside Unit (RSU) refers to a control and monitoring system that connects to sensors, decision-making systems for enabling a traffic safety system for connected vehicles. The "connected vehicle train-vehicle collision detection system," in addition to the exemplary hardware description above, refers to a system that is configured to provide communications from Vehicle to either another Vehicle (V2V) or to roadside Infrastructure (V2I) for creating an ecosystem of connected vehicles, operated by a controller (including but not limited to smart infrastructure equipment connected to traffic signal light controllers and traffic management systems, and others). The connected vehicle train-vehicle collision detection system can include multiple interacting systems, whether located together or apart, that together perform processes as described herein.

The Onboard Unit (OBU)-equipped vehicle 15 includes an OBU or OB device 35 that privately and securely: transmit vehicle location, heading and speed data to nearby OBU-equipped vehicles ten times per second, receive vehicle location, heading and speed data from nearby OBU-equipped vehicles and/or receive a General Packet Radio Service (GPRS) location from the Roadside Unit (RSU) 30 to correct a Global Positioning System (GPS) device the Onboard Unit (OBU) having less accuracy. However, the U.S. Department of Transportation (DOT) defines three classes of OBU devices: i. Class 1: OBU built into the new vehicle, ii. Class 2: OBU available as an aftermarket device for older vehicles, cyclists and pedestrians, and iii. Class 3: OBU available as a smart phone app for drivers, cyclists and pedestrians. Creation and use of this data is not limited to vehicles, but can be created and used by other moving objects, such as bicycles.

The techniques described herein can be particularly useful for using an Onboard Unit (OBU) or OB device. While particular embodiments are described in terms of Onboard Unit (OBU), the techniques described herein are not limited to Onboard Unit (OBU) but can also use other Vehicle to Vehicle/Infrastructure/Traffic Management System (V2X) empowered software and hardware such as other smart automotive interactive communication modules.

The Onboard Unit (OBU)-equipped vehicle 15 uses real-time traffic data to provide proactive driver warnings for collisions with TRAINs and other vehicles before they occur. In addition to the Onboard Unit (OBU)-equipped vehicle 15, the real-time traffic data may be created and used by other OBU-connected moving objects, such as bicycles. In this way, by providing a fully automated network of vehicles, bicycles aware of each other and their environment the connected vehicle traffic safety system 10 makes mobility safer.

In the Onboard Unit (OBU)-equipped vehicle 15, the Onboard Unit (OBU) 35 includes a wireless device 40. Likewise, the Roadside Unit (RSU) 30 includes a processor 50, a wireless transceiver 55, and a storage media 60 to store a software module 65. The Roadside Unit (RSU) 30 may be located at a railroad grade crossing 70 near a roadway lane 72.

The software module 65 of the Roadside Unit (RSU) 30 is configured to calculate a first arrival time (FAT) 75 of a TRAIN 80 at the railroad grade crossing 70 based on a location data 85(1) of the TRAIN 80 and a speed data 85(2) of the TRAIN 80 near the railroad grade crossing 70. The Roadside Unit (RSU) 30 is configured to transmit a first connected vehicle message 90 to the Onboard Unit (OBU)-equipped vehicle 15 having the Onboard Unit (OBU) 35 at the railroad grade crossing 70. The first connected vehicle message 90 may include the location data 85(1) and the speed data 85(2) of the TRAIN 80 as it approaches the railroad grade crossing 70. An example of the first connected vehicle message 90 includes a wireless message based on the SAE J2735 standard.

The Onboard Unit (OBU) 35 of the Onboard Unit (OBU)-equipped vehicle 15 is configured to calculate a train-vehicle crash indication 105 based on the first arrival time 75 of the TRAIN 80 at the railroad grade crossing 70 and a second arrival time (SAT) 110 of the Onboard Unit (OBU)-equipped vehicle 15 at the railroad grade crossing 70. The Onboard Unit (OBU) 35 of the Onboard Unit (OBU)-equipped vehicle 15 is configured to generate a first warning 112 based on the train-vehicle crash indication 105 if the Onboard Unit (OBU)-equipped vehicle 15 is predicted to arrive at the same time as the TRAIN 80 since the first arrival time (FAT) 75 of the TRAIN 80 and the second arrival time (SAT) 110 of the Onboard Unit (OBU)-equipped vehicle 15 are substantially same.

The Roadside Unit (RSU) 30 may be coupled to a traffic signal controller 95 connected to a traffic signal S1 97. The first traffic signal S1 97 may be located at the roadway lane 72 on which the Onboard Unit (OBU)-equipped vehicle 15 may travel. The traffic signal controller 95 is configured to operate the first traffic signal S1 97.

The traffic signal controller 95 may be connected via a buried fiber to a Traffic Management Centre (TMC) for delivering traffic and travel information to motor vehicle drivers. The traffic signal controller 95 may be connected via Ethernet or Wi-Fi to the Roadside Unit (RSU) 30.

The Roadside Unit (RSU) 30 may be coupled to municipalities infrastructure 100(1) which in turn are connected to service providers infrastructure 100(2). In a cloud, via a switch a RSU provisioning and network management server, a certification authority and a gateway to other networks of the municipalities infrastructure 100(1) may be connected to the Roadside Unit (RSU) 30. The municipalities infrastructure 100(1) may handle registrations, subscriptions, operations, rules, management and maintenance. The service providers infrastructure 100(2) may include an Original Equipment Manufacturer (OEM)/Internet Service Provider (ISP) applications server, a content and services server, and an OBU provisioning server. It should be appreciated that several other components may be included in the municipalities infrastructure 100(1) and the service providers infrastructure 100(2). However, the function and use of such equipment for a traffic control application are well known in the art and are not discussed further.

In operation, the Roadside Unit (RSU) 30 may be configured to transmit wireless signals and receive corresponding responses from the wireless device 40 of the Onboard Unit (OBU)-equipped vehicle 15, and to send vehicle location data 115(1), direction heading data 115(2) and speed data 115(3) from the OBU-equipped vehicle 15 to the traffic signal controller 95. The Onboard Unit (OBU) 35 of the Onboard Unit (OBU)-equipped vehicle 15 broadcast the vehicle location data 115(1), the direction heading data 115(2), and the speed data 115(3) in a Basic Safety Message (BSM) 117. The BSM 117 in one embodiment is a wireless message broadcast for a connected V2V safety application and is built around the SAE J2735 standard.

An example of the vehicle location data 115(1) is GPS co-ordinates, i.e., longitude and latitude co-ordinates of a global location on the surface of Earth by a Global Positioning System (GPS) such as via a Google Maps APP or via a hardware GPS chip. An example of the direction heading data 115(2) may be a direction indication generated indicating a north (N), south (S), east (E), and west (W), SE, ES, WS, or NW direction of the Onboard Unit (OBU)-equipped vehicle 15 on the roadway lane 72. An example of the speed data 115(3) may be a speed value of the Onboard Unit (OBU)-equipped vehicle 15 on the roadway lane 72.

In one embodiment, real-time data about location, speed, arrival time of the TRAIN 80 may be broadcast by the Roadside Unit (RSU) 30 acting as an OBU for the TRAIN 80 and received by OBU-equipped vehicles such as the Onboard Unit (OBU)-equipped vehicle 15. For example, the Onboard Unit (OBU)-equipped vehicle 15 may receive TRAIN 80 location information over DSRC.

In one embodiment, the Roadside Unit (RSU) 30 may calculate the first arrival time (FAT) 75 of the TRAIN 80 at the railroad grade crossing 70 based on a speed of the TRAIN 80 and a track geometry map 120. Alternatively, the Roadside Unit (RSU) 30 may calculate the first arrival time (FAT) 75 of the TRAIN 80 at the railroad grade crossing 70 based on a speed of the TRAIN 80 determined by a distance between first and second detectors 150(1-2) as shown in detail in FIG. 5 on a railway TRACK 145 and a time between actuations of the first and second detectors 150(1-2). The Roadside Unit (RSU) 30 may broadcast a Signal Request Message (SRM) 122 including a TRAIN Vehicle Identification Number (VIN) 125, a location 127, a heading 130, a speed 135 and the first arrival time (FAT) 75 of the TRAIN 80.

A Vehicle Awareness Device such as the OBU 35 broadcasts the Basic Safety Message (BSM) 117, including vehicle position, direction and speed. The Onboard Unit (OBU) 35 of the OBU-equipped vehicle 15 may calculate the second arrival time (SAT) 110 of the OBU-equipped vehicle 15 at the railroad grade crossing 70 based on the vehicle location data 115(1), direction heading data 115(2), and speed data 115(3) of the OBU-equipped vehicle 15. Once OBU-equipped vehicles are aware of the location, direction and speed of the TRAIN 80, drivers can be warned of any potential vehicle-train crashes and vehicle active safety systems may avoid collisions.

In one embodiment, the Onboard Unit (OBU) 35 of the OBU-equipped vehicle 15 is configured to provide the first warning 112 to a driver 106 of the OBU-equipped vehicle 15 via the Onboard Unit (OBU) 35 at a distance d 108 exceeding 400 meters from the railroad grade crossing 70. The Onboard Unit (OBU) 35 of the OBU-equipped vehicle 15 is configured to generate the first warning 112 for the train-vehicle crash if the OBU-equipped vehicle 15 is predicted to arrive at the same time as the TRAIN 80 since the first arrival time (FAT) 75 of the TRAIN 80 and the second arrival time (SAT) 110 of the Onboard Unit (OBU)-equipped vehicle 15 are substantially same. The OBU-equipped vehicle 15 includes a vehicle braking system 118 that automatically activates to avoid the train-vehicle crash if the driver 106 does not respond to the first warning 112.

According to one embodiment, the Roadside Unit (RSU) 30 may broadcast a Lane Placement (MAP) message 140 to the OBU-equipped vehicle 15 and to nearby OBU-equipped vehicles in order to indicate a location of the railroad grade crossing 70 and the roadway lane 72. The Lane Placement (MAP) message 140 may indicate the railway TRACK 145 and the roadway lane 72 geometries.

Figure 2:
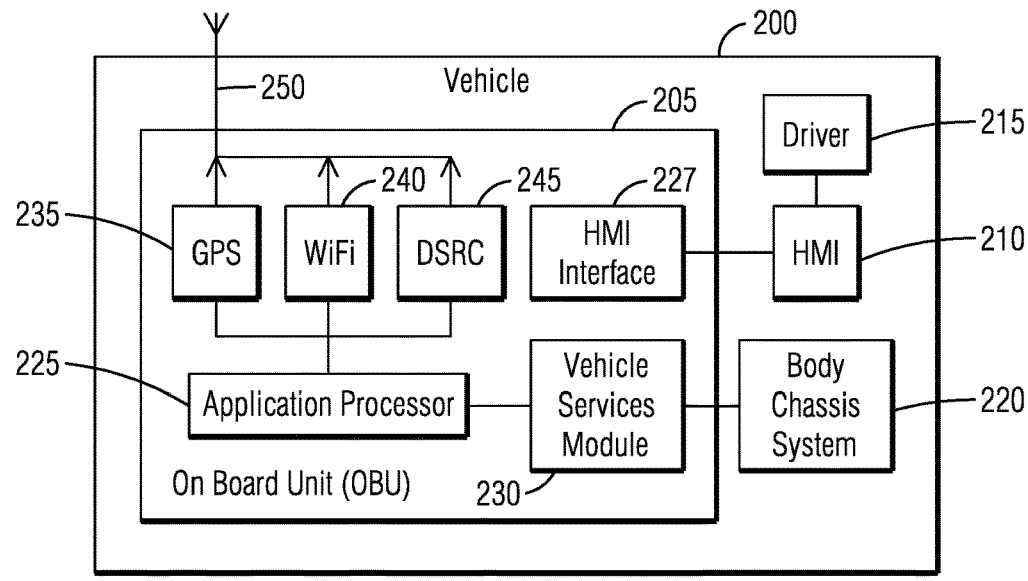
FIG. 2 illustrates a schematic of an Onboard Unit (OBU)-equipped vehicle equipped with an Onboard Unit (OBU) in accordance with an exemplary embodiment of the present invention.

Referring to FIG. 2, it illustrates a schematic of an Onboard Unit (OBU)-equipped vehicle 200 equipped with an Onboard Unit (OBU) 205 in accordance with an exemplary embodiment of the present invention. The OBU-equipped vehicle 200 may include a Human Machine Interface (HMI) 210 for a driver 215 to interface with the OBU 205. The OBU-equipped vehicle 200 may also include a body chassis system 220 to interface with the OBU 205.

In one embodiment, the OBU 205 may include an application processor 225, a HMI interface 227, and a vehicle services module 230. The OBU 205 may further include a GPS chip 235, a Wi-Fi transceiver 240, a Dedicated Short-Range Communications (DSRC) device 245, and an antenna 250 to which they are coupled for conducting wireless communications.

As shown, the HMI interface 227 is coupled to the HMI 210 and the vehicle services module 230 is coupled to the body chassis system 220. The GPS chip 235 provides GPS communications for determining and communicating location of the OBU-equipped vehicle 200. The Wi-Fi transceiver 240 provides communications to Wi-Fi hotspots and other ISP networks to connect the OBU-equipped vehicle 200 to the Internet. As a part of an intelligent transportation system (ITS), the DSRC device 245 may operate as a network node to provide dedicated short-range vehicular communications in 5.9 GHz band with bandwidth of 75 MHz and has an approximate range of 1000 m.

Figure 3:
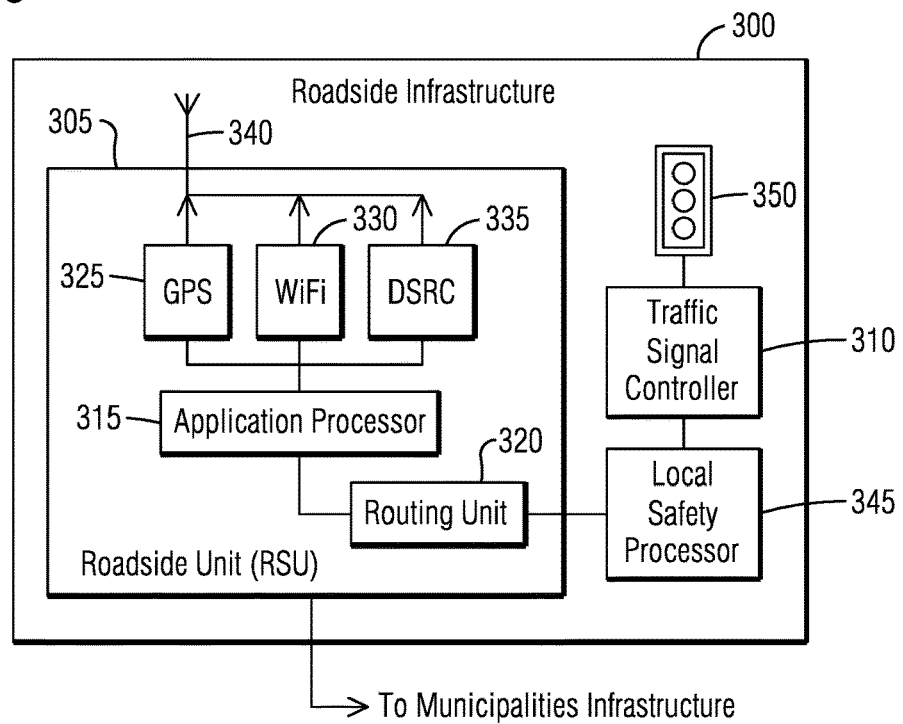
FIG. 3 illustrates a schematic of roadside infrastructure including a Roadside Unit (RSU) and a traffic signal controller in accordance with an exemplary embodiment of the present invention.

Turning now to FIG. 3, it illustrates a schematic of roadside infrastructure 300 including a Roadside Unit (RSU) 305 and a traffic signal controller 310 in accordance with an exemplary embodiment of the present invention. In one embodiment, the RSU 305 may include an application processor 315 and a routing unit 320. The RSU 305 may further include a GPS chip 325, a Wi-Fi transceiver 330, a Dedicated Short-Range Communications (DSRC) device 335, and an antenna 340 to which they are coupled for conducting wireless communications. GPS is one example of a location device. Others include beacons, dead reckoning and other navigation location services.

The routing unit 320 may be coupled to a local safety processor 345 which connects to the traffic signal controller 310 linked to a traffic signal 350. The routing unit 320 may further couple the RSU 305 to the municipalities infrastructure 85 of FIG. 1.

The GPS chip 325 provides GPS communications for determining and communicating location information of a non-OBU-equipped vehicle. The Wi-Fi transceiver 330 provides communications to Wi-Fi hotspots and other ISP networks to connect the RSU 305 to the Internet. As a part of an intelligent transportation system (ITS), the DSRC device 335 may operate as a network node to provide dedicated short-range vehicular communications in 5.9 GHz band with bandwidth of 75 MHz in an approximate range of 1000 m.

Figure 4:
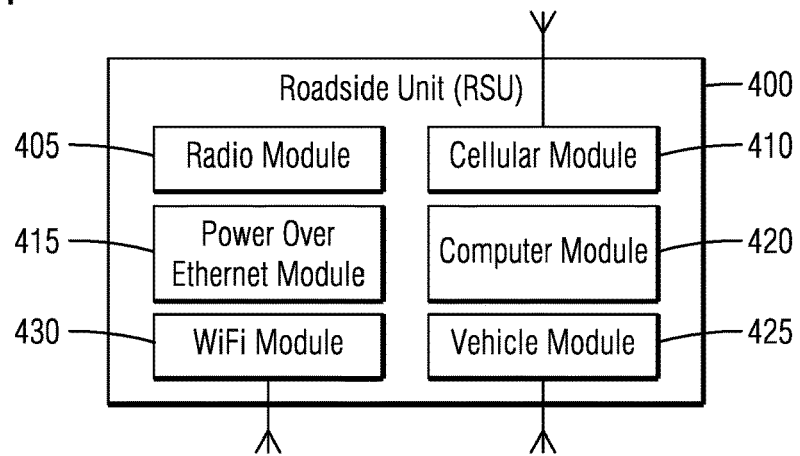
FIG. 4 illustrates a schematic of a Roadside Unit (RSU) in accordance with an exemplary embodiment of the present invention.

FIG. 4 illustrates a schematic of a Roadside Unit (RSU) 400 in accordance with another exemplary embodiment of the present invention. In one embodiment, the RSU 400 may include a radio module 405, a cellular module 410, a power over Ethernet module 415, a computer module 420, a vehicle module 425 and a Wi-Fi module 430. The cellular module 410 may provide mobile communications with cell phones of drivers. The power over Ethernet module 415 may provide a wired Internet connection to the RSU 400. The vehicle module 425 may support a non-Onboard Unit (OBU)-equipped vehicle and/or the Onboard Unit (OBU)-equipped vehicle 15 related activities of the connected vehicle traffic safety system 10 of FIG. 1.

The radio module 405 may include a DSRC device to operate as a network node to provide dedicated short-range vehicular communications in 5.9 GHz band with bandwidth of 75 MHz in an approximate range of 1000 m. The computer module 420 may include a processor to execute a traffic control software stored in a storage device for the RSU 400. The Wi-Fi module 430 provides communications to Wi-Fi hotspots and other ISP networks to wirelessly connect the RSU 400 to the Internet.

Figure 5:
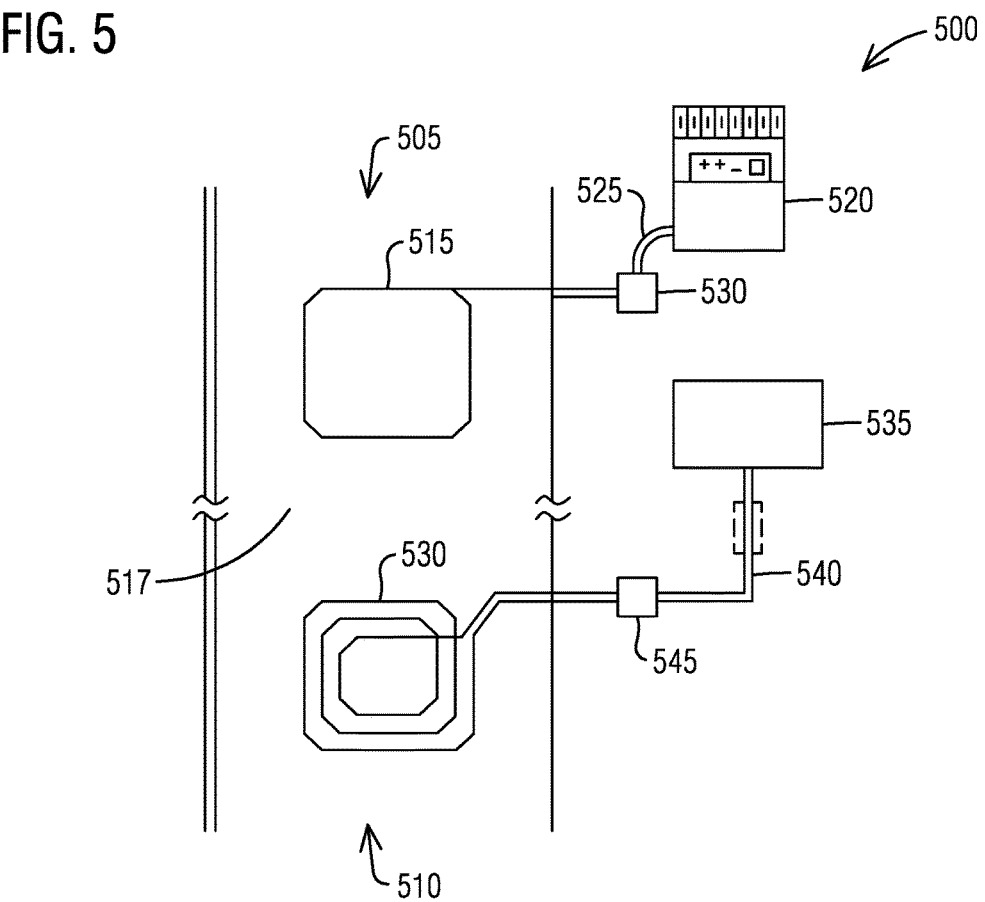
FIG. 5 illustrates a schematic of a TRAIN detection device in accordance with an exemplary embodiment of the present invention.

As shown in FIG. 5, it illustrates a schematic of a TRAIN detection device 500 in accordance with an exemplary embodiment of the present invention. The TRAIN detection device 500 includes a TRAIN detection loop, called inductive-loop traffic detectors to detect TRAINs passing or arriving at a certain point, for instance approaching the railroad grade crossing 70. For example, the TRAIN detection device 500 may be either a loop sawcut TRAIN detector 505 or a loop wire TRAIN detector 510.

According to one embodiment, the loop sawcut TRAIN detector 505 includes an insulated, electrically conducting sawcut loop 515, an electronics unit 520, a lead-in cable 525 and a pullbox 530. The insulated, electrically conducting sawcut loop 515 is installed in the railway TRACK 145. The electronics unit 520 transmits energy into the sawcut loop 515 at frequencies between 10 kHz to 200 kHz via the lead-in cable 525 and the pullbox 530. The inductive-loop system behaves as a tuned electrical circuit in which the sawcut loop 515 and the lead-in cable 525 are the inductive elements. When a TRAIN passes over the sawcut loop 515 or is stopped within the sawcut loop 515, the TRAIN induces eddy currents in the sawcut loop 515, which decrease their inductance. The decreased inductance actuates the electronics unit 520 output relay or solid-state optically isolated output, which sends a pulse to the traffic signal controller 95 signifying the passage or presence of a TRAIN.

For the loop wire TRAIN detector 510, an insulated, electrically conducting wire loop 530 is installed in the railway TRACK 145. An electronics unit 535 transmits energy into the wire loop 530 at frequencies between 10 kHz to 200 kHz via a lead-in cable 540 and a splice in pullbox 545. The inductive-loop system behaves as a tuned electrical circuit in which the wire loop 530 and the lead-in cable 540 are the inductive elements. Like the loop sawcut TRAIN detector 505, when a TRAIN passes over the wire loop 530 or is stopped within the wire loop 530, the electronics unit 535 output relay or solid-state optically isolated output sends a pulse to the traffic signal controller 95 signifying the passage or presence of a TRAIN.

Figure 6:
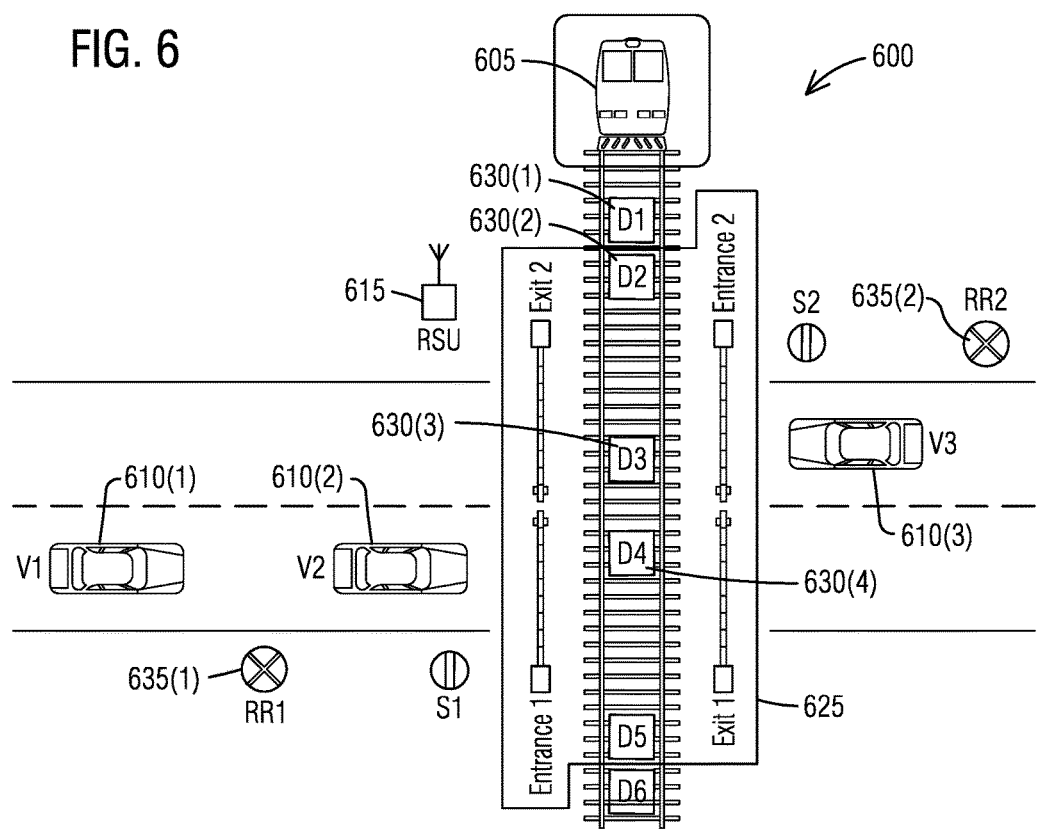
FIG. 6 illustrates a first train-vehicle collision detection system that provides a warning for a vehicle-train crash for a TRAIN not equipped with an OBU while vehicles V1, V2, V3 are equipped with OBUs in accordance with an exemplary embodiment of the present invention.

As seen in FIG. 6, it illustrates a first train-vehicle collision detection system 600 that provides a warning for a vehicle-train crash for a TRAIN 605 not equipped with an OBU while vehicles V1, V2, V3 610(1-3) are equipped with OBUs in accordance with an exemplary embodiment of the present invention.

The first train-vehicle collision detection system 600 includes a Roadside Unit (RSU) 615. In this embodiment, the vehicles V1, V2, V3 610(1-3) are equipped with OBUs of one or more of the following types: a) Class 1: Original Equipment Manufacturer, supplied as part of the new vehicle, b) Class 2: Aftermarket device installed in an older vehicle, and c) Class 3: Smart phone app carried by the driver.

In operation, a) the Roadside Unit (RSU) 615 precisely calculates an arrival time of the TRAIN 605 at a railroad grade crossing 625, b) the OBUs of the vehicles V1, V2, V3 610(1-3) precisely calculate an arrival time of vehicles V1, V2, V3 610(1-3) at the railroad grade crossing 625, c) from all the arrival times, the the OBUs of the vehicles V1, V2, V3 610(1-3) predicts train/vehicle crashes before they occur, d) the OBUs of the vehicles V1, V2, V3 610(1-3) warn drivers of predicted train/vehicle crashes at distances of 400 meters or more, and e) the OBUs of the vehicles V1, V2, V3 610(1-3) warn the drivers of predicted vehicle/vehicle crashes into long queues stopped for the TRAIN 605. An Onboard Unit (OBU) of a second Onboard Unit (OBU)-equipped vehicle V1 610(1) traveling towards one or more vehicles stopped in a queue at the railroad grade crossing 625 for the TRAIN 605 is configured to predict a vehicle-vehicle crash indication 627 based on a location of the TRAIN 605 and a location of the second OBU-equipped vehicle V1 610(1).

The RSU 615 software combines roadway lane placement and track geometries with outputs of detectors D1-D4 630 (1-4) in order to create and transmit the following Connected Vehicle SAE Standard J2735 wireless messages to nearby OBU-equipped vehicles: a) drivers of the vehicles V1, V2, V3 610(1-3) receive rail crossing warnings at distances exceeding 400 meters, long before RR1 and RR2 signs 635(1-2), b) based on the distance and time between detectors D1 and D2 630(1-2) actuations, the TRAIN 605 speed is calculated by the RSU 615, c) a TRAIN Vehicle Identification Number (VIN) is determined by a train schedule and a direction of travel, d) based on a track geometry MAP, the TRAIN 605 arrival time at the railroad grade crossing 625 is determined from the TRAIN 605 speed, e) the RSU 615 software broadcasts a Signal Request Message (SRM) including the TRAIN 605 VIN, location, heading, speed and arrival time, f) the vehicles V1, V2, V3 610(1-3) receive a TRAIN warning via their OBUs at distances of 400 meters or more, g) the RSU 615 software broadcasts a MAP to the vehicles V1, V2, V3 610(1-3) in order to indicate where the railroad grade crossing 625 and roadway lanes are located, h) drivers of the vehicles V1, V2, V3 610(1-3) receive crash warnings if predicted to arrive at the same time at the railroad grade crossing 625 as the TRAIN 605, i) drivers of the vehicles V1, V2, V3 610(1-3) receive crash warnings if on trajectories toward vehicles stopped in a vehicle queue at the railroad grade crossing 625, and j) one or more vehicle braking systems activate to avoid a crash if a driver of the vehicles V1, V2, or V3 610(1-3) does not respond to the TRAIN warnings.

The above set forth wireless messages are dialogs of the following SAE J2735 standard objects known to the OBUs: a) a Basic Safety Message (BSM) containing location, heading and speed of the vehicles V1, V2 and V3 610(1-3), b) a Lane Placement (MAP) message of the track and lane geometries, c) a Signal Phase and Timing (SPaT) message of the signal to track and lane association, plus signal countdown, d) a Signal Request Message (SRM) that includes BSM information plus train VIN and arrival time, and e) a Signal Status Message (SSM) that indicates the status of the signals.

Figure 7:
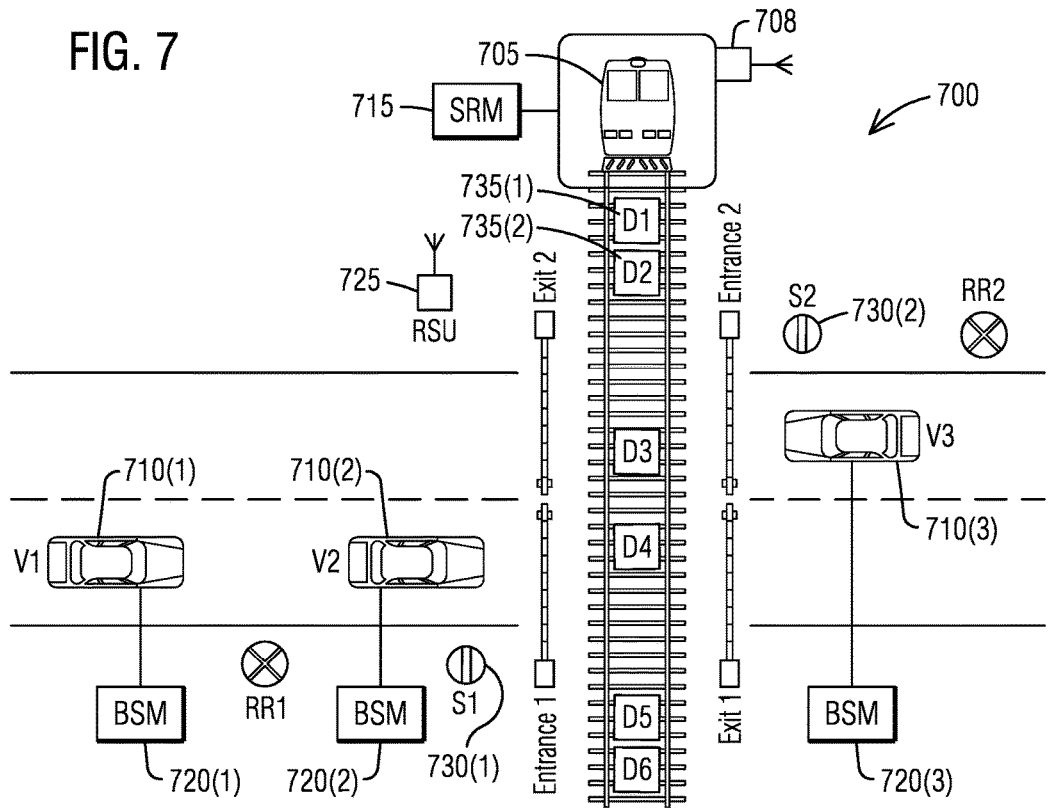
FIG. 7 illustrates a second train-vehicle collision detection system that provides a warning for a vehicle-train crash for a TRAIN equipped with an OBU while vehicles V1, V2, V3 are equipped with OBUs in accordance with an exemplary embodiment of the present invention.

FIG. 7 illustrates a second train-vehicle collision detection system 700 that provides a warning for a vehicle-train crash for a TRAIN 705 equipped with an OBU 708 while vehicles V1, V2, V3 710(1-3) are equipped with OBUs in accordance with an exemplary embodiment of the present invention.

The TRAIN OBU 708 may transmit a Signal Request Message (SRM) 715 10 times per second consisting of VIN, location, speed and heading. The TRAIN OBU 708 also receives a Basic Safety Message (BSM) 720(1-3) from each vehicle V1, V2, V3 710(1-3) ten times per second consisting of location, speed and heading without vehicle identification for driver privacy.

In this embodiment, the TRAIN SRM 715 is used by a Roadside Unit (RSU) 725 to activate two crossing signals S1, S2 730(1-2) and acoustic warning, while detectors D1 and D2 735(1-2) are used as a fail-safe backup in case the OBU 708 is not working. The Roadside Unit (RSU) 725 blends messages from OBU-equipped and unequipped TRAINs during the years until all trains are equipped with OBUs.

Once equipped with the OBU 708, the TRAIN 705 may broadcast the SRM 715 directly to the vehicles V1, V2, V3 710(1-3). This "Future Proofs" today's equipment installations. There is no need to replace equipment for smart trains later on. The TRAIN 705 may offer a powerful safety feature to eliminate crashes. The TRAIN 705 detection migrates from an infrastructure cost to a rolling stock cost.

The second train-vehicle collision detection system 700 may blend safety messages for new vehicle safety in a connected vehicle system. The SAE J2735 Data Dictionary contains a rich set of wireless messages that can be created by the second train-vehicle collision detection system 700, which are not limited to the dangerous situations described above. The second train-vehicle collision detection system 700 can incorporate additional information such as curves leading up to railroad grade crossings, icy conditions that require additional stopping distances, vehicle accelerometers that identify deteriorating crossings and others.

Figure 8:
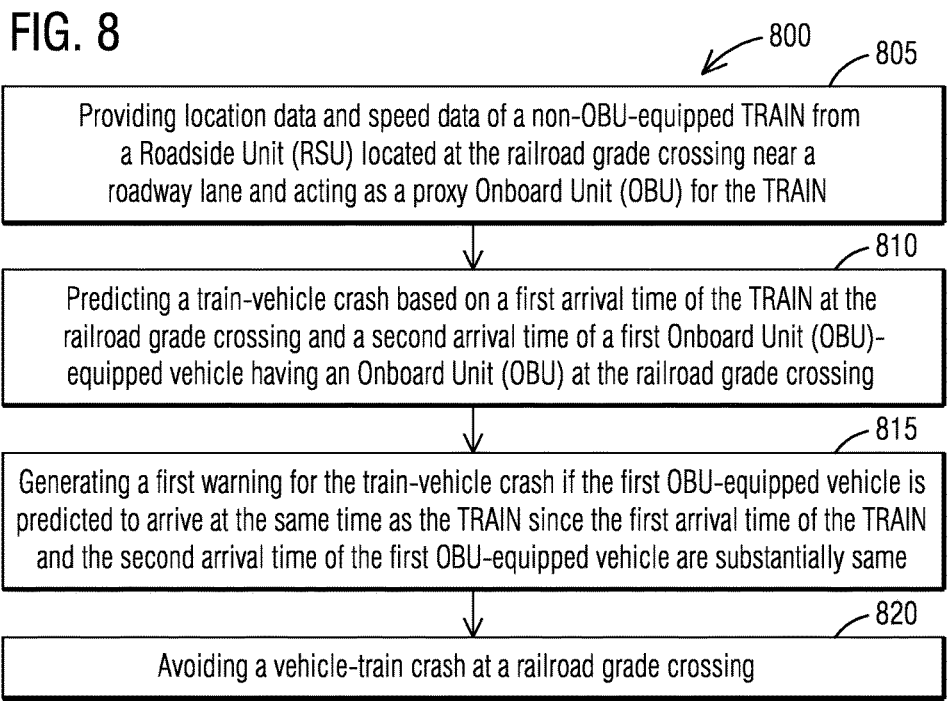
FIG. 8 illustrates a flow chart of a method of predicting and avoiding vehicle-train crashes at railroad grade crossings in accordance with an exemplary embodiment of the present invention.

FIG. 8 illustrates a flow chart of a method 800 of predicting and avoiding vehicle-train crashes at railroad grade crossings in accordance with an exemplary embodiment of the present invention. Reference is made to the elements and features described in FIGS. 1-7. It should be appreciated that some steps are not required to be performed in any particular order, and that some steps are optional.

In step 805, the method 800 provides the location data 85(1) and the speed data 85(2) of the non-OBU-equipped TRAIN 605 from the Roadside Unit (RSU) 615 located at the railroad grade crossing 625 near a roadway lane and acting as a proxy Onboard Unit (OBU) for the TRAIN 605. In step 810, the method 800 includes predicting a train-vehicle crash based on the first arrival time (FAT) 75 of the TRAIN 605 at the railroad grade crossing 625 and the second arrival time (SAT) 110 of the Onboard Unit (OBU)-equipped vehicle 15 having the Onboard Unit (OBU) 35 at the railroad grade crossing 625. In step 815, the method 800 includes generating the first warning 112 for the train-vehicle crash if the OBU-equipped vehicle 15 is predicted to arrive at the same time as the TRAIN 605 since the first arrival time (FAT) 75 of the TRAIN 605 and the second arrival time (SAT) 110 of the OBU-equipped vehicle 15 are substantially same. In step 820, the method 800 includes avoiding the vehicle-train crash at the railroad grade crossing 625 by activating the vehicle braking system 118 to avoid the vehicle-train crash.

The method 800 further includes calculating the first arrival time (FAT) 75 of the TRAIN 605 at the railroad grade crossing 625 based on a speed and a location of the TRAIN 605. The speed may be determined by a distance between the first and second detectors 150(1-2) and a time between actuations of the first and second detectors 150(1-2). The method 800 further includes calculating the second arrival time (SAT) 110 of the OBU-equipped vehicle 15 at the railroad grade crossing 625 based on at least one of vehicle location data 115(1), direction heading data 115(2), and speed data 115(3) of the OBU-equipped vehicle 15.

The connected vehicle train-vehicle collision detection system 10 may use Dedicated Short-Range Communications (DSRC) as a medium range wireless communication channel dedicated to OBU vehicles to provide communications from Vehicle to either another Vehicle (V2V) or to roadside Infrastructure (V2I). On-Board-Units (OBUs) may be retrofitted to existing cars or built into new cars, with the goal of creating an ecosystem of connected vehicles.

As a threat to any vehicle comes from other vehicles and a TRAIN, the connected vehicle train-vehicle collision detection system 10 may enable vehicles to exchange information about themselves with the other vehicles and the TRAIN in the vicinity, and vice versa. The OBU-equipped vehicles could communicate highly accurate information such as speed, acceleration, steering angle, existence of a trailer, failure of a headlight or brake light, etc—to offer near-instantaneous feedback to enable evasive or preventive action. Such information would provide highly reliable, real-time situational awareness based on which smart decisions can be taken.

With the use of smart infrastructure equipment connected to weather/environmental systems, traffic signal light controllers and traffic management systems, the connected vehicle train-vehicle collision detection system 10 may enable the OBU-equipped vehicles to now make use of real-time information to make smarter and safer decisions. The OBU-equipped vehicles are enabled to know the status of infrastructure, for example the approaching TRAIN. In this way, the OBU-equipped vehicles are better equipped to make decisions that affect travel time, routes and fuel consumption.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Although the steps, operations, or computations may be presented in a specific order, this order may be changed in different embodiments. In some embodiments, to the extent multiple steps are shown as sequential in this specification, some combination of such steps in alternative embodiments may be performed at the same time.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A connected vehicle train-vehicle collision detection system, comprising:
    a roadside unit (RSU) configured to be located at a railroad grade crossing near a roadway lane, wherein the roadside unit (RSU) is configured to calculate a first arrival time of a TRAIN at the railroad grade crossing based on a location data and a speed data of the TRAIN near the railroad grade crossing,
    wherein the roadside unit (RSU) is configured to transmit a first connected vehicle message to a first Onboard Unit (OBU)-equipped vehicle having an Onboard Unit (OBU) at the railroad grade crossing, the first connected vehicle message including the location data and the speed data of the TRAIN as it approaches the railroad grade crossing,
    wherein the Onboard Unit (OBU) of the first OBU-equipped vehicle is configured to calculate a train-vehicle crash indication based on the first arrival time of the TRAIN at the railroad grade crossing and a second arrival time of the first OBU-equipped vehicle at the railroad grade crossing,
    wherein the Onboard Unit (OBU) of the first OBU-equipped vehicle is configured to generate a first warning for the train-vehicle crash indication if the first OBU-equipped vehicle is predicted to arrive at the same time as the TRAIN since the first arrival time of the TRAIN and the second arrival time of the first OBU-equipped vehicle are substantially same,
    wherein the TRAIN includes an Onboard Unit (OBU),
    wherein the roadside unit (RSU) is configured to use a Signal Request Message (SRM) from the Onboard Unit (OBU) of the TRAIN to activate a crossing signal and an acoustic warning, and
    wherein the roadside unit (RSU) is configured to use first and second detectors D1 and D2 as a fail-safe backup in case the Onboard Unit (OBU) of the TRAIN is not working.

2. The system of claim 1, wherein the roadside unit (RSU) comprising at least a processor and a wireless transceiver, wherein the roadside unit (RSU) is configured to transmit wireless signals and receive corresponding responses from a corresponding wireless device of the first OBU-equipped vehicle, wherein the roadside unit (RSU) is configured to receive from the Onboard Unit (OBU) of the first OBU-equipped vehicle via a broadcast at least one of vehicle location data, direction heading data, and speed data in a Basic Safety Message (BSM).

3. The system of claim 2, wherein the roadside unit (RSU) is configured to calculate the first arrival time of the TRAIN at the railroad grade crossing based on a speed of the TRAIN determined by a distance between first and second detectors and a time between actuations of the first and second detectors.

4. The system of claim 3, wherein the Onboard Unit (OBU) of the first OBU-equipped vehicle is configured to calculate the second arrival time of the first OBU-equipped vehicle at the railroad grade crossing based on the at least one of vehicle location data, direction heading data, and speed data of the first OBU-equipped vehicle.

5. The system of claim 1, wherein an Onboard Unit (OBU) of a second Onboard Unit (OBU)-equipped vehicle traveling towards one or more vehicles stopped in a queue at the railroad grade crossing for the TRAIN is configured to predict a vehicle-vehicle crash indication based a location of the TRAIN and a location of the second OBU-equipped vehicle.

6. The system of claim 5, wherein the Onboard Unit (OBU) of the second Onboard Unit (OBU)-equipped vehicle to generate a second warning for the vehicle-vehicle crash indication based on a trajectory calculation of the second OBU-equipped vehicle in that if the second OBU-equipped vehicle is predicted to be traveling on a trajectory towards the one or more vehicles stopped in the queue.

7. The system of claim 1, wherein the Onboard Unit (OBU) of the first OBU-equipped vehicle is configured to provide the first waning to a driver of the first OBU-equipped vehicle via the Onboard Unit (OBU) at a distance d exceeding 400 meters from the railroad grade crossing.

8. The system of claim 1, wherein the roadside unit (RSU) is configured to calculate the first arrival time of the TRAIN at the railroad grade crossing based on a speed of the TRAIN and a track geometry map.

9. The system of claim 1, wherein the roadside unit (RSU) is configured to broadcast a Signal Request Message (SRM) including a TRAIN Vehicle Identification Number (VIN), a location, a heading, a speed and the first arrival time.

10. The system of claim 1, wherein the roadside unit (RSU) is configured to broadcast a Lane Placement (MAP) message to the first OBU-equipped vehicle and nearby OBU-equipped vehicles in order to indicate a location of the railroad grade crossing and the roadway lane.

11. The system of claim 1, wherein a vehicle braking system of the first OBU-equipped vehicle is configured to activate to avoid a train-vehicle crash if a driver does not respond to the first warning.

12. The system of claim 1, wherein the Onboard Unit (OBU) of the TRAIN is configured to broadcast a Signal Request Message (SRM) including a TRAIN Vehicle Identification Number (VIN), a location, a heading, and a speed.

13. The system of claim 1, wherein the Onboard Unit (OBU) of the TRAIN is configured to receive a Basic Safety Message (BSM) from the first OBU-equipped vehicle and nearby OBU-equipped vehicles, the Basic Safety Message (BSM) including of a location, a speed and a heading.

* * * * *